United States Patent [19]

Lefever

[11] 3,734,136
[45] May 22, 1973

[54] PIPELINE CONTENTS IGNITER
[75] Inventor: Kenneth W. Lefever, Waterford, Va.
[73] Assignee: Valdez-Lefever Artic Gas and Oil Transportation Corporation, Washington, D.C.
[22] Filed: Mar. 30, 1971
[21] Appl. No.: 129,548

[52] U.S. Cl. ..........................138/103, 137/1, 44/39
[51] Int. Cl. ...............................................F16l 55/00
[58] Field of Search ...............138/103, 104; 137/1, 137/13, 68, 72; 285/3, 93; 44/36, 39

[56] References Cited

UNITED STATES PATENTS 3,304,161   2/1967   McGoff .............................44/39 X
3,393,690   7/1968   Chu et al. ..........................137/13

Primary Examiner—William R. Cline
Attorney—Bacon & Thomas

[57] ABSTRACT

A pipeline for transmitting crude oil or the like is fitted with longitudinally extending igniters, each comprising a casing containing thermite packed about a phosphorus core. If a violent rupture of the pipeline occurs at least one igniter will also be ruptured, whereupon the phosphorus will ignite the thermite, which will in turn ignite the pipeline contents so that such will burn off rather than pollute streams and other features of the nearby area.

4 Claims, 2 Drawing Figures

PATENTED MAY 22 1973 3,734,136

INVENTOR
KENNETH W. LEFEVER
BY
Bacon & Thomas
ATTORNEYS ns/pipelines3,734,136

PIPELINE CONTENTS IGNITER

BACKGROUND OF THE INVENTION

1. Field of the Invention

The present invention relates generally to pipelines for carrying oil and the like, and more particularly to a pipeline including means for igniting the contents of a ruptured pipeline to effect a burnoff thereof.

2. Description of the Prior Art

The transport of oil and other combustible products over long distances by unattended pipelines is common. It occasionally happens that a rupture of a pipeline will occur in a remote region, often resulting in the spillage of large quantities of the oil or other material being transported before shutdown and repair can be accomplished. The environmental pollution caused by such spillages can be severe, especially in a region where lakes and streams abound.

While a spillage of oil from a pipeline break in the middle of a desert may do little harm, the same amount of spillage in an environmentally rich area might cause massive and irrepairable damage. Concern for environmental protection is especially great when pipelines are laid in the Arctic region and other remote, virgin areas, where any significant pollution might adversely affect the ecology of a large geographic region.

There is thus need for a pipeline construction that will prevent runoffs of a liquid being transported when rupture of the pipeline occurs. The present invention is directed toward satisfying that need.

SUMMARY OF THE INVENTION

The present invention is based on the premise that in many remote and virgin areas it would be far better to burn off oil flowing from a pipeline rupture, than to allow such oil to flow over the ground and into streams and lakes. While the smoke and heat from a fire themselves tend to pollute an area, such fire pollution is usually not totally foreign to a region, and in any case is far preferable to the permanent damage that the surface spillage of oil can cause.

The pipeline of the present invention is constructed in the usual manner, but has a plurality of spaced, longitudinally extending igniter tubes secured to the exterior thereof. Each igniter tube comprises a casing sealed at both ends, and filled with termite compacted around a central phosphorus core. Thermite is a common generic name for a mixture of aluminum in fine grains with an oxide of a chemically weaker metal, usually iron, such mixture being commonly sold under the trademark "THERMIT."

The igniters are so placed that at least one thereof will be ruptured if a major blow-out or rupture of the pipeline occurs. When an igniter is ruptured the phosphorus is exposed to the air and is thereby ignited. The burning phosphorus then ignites the thermite, which generates sufficient heat to ignite crude oil or other petroleum products that are being transported through the broken pipeline. Once ignited the oil will be burned off, and spillage thereof over a large area avoided. Once repair crews reach the site and close the pipeline down upstream of the rupture, the burnoff will automatically terminate.

It is a principal object of the present invention to provide a pipeline with an igniter, designed to set fire to the escaping contents of the pipeline when a rupture occurs.

Another object is to provide an igniter for a pipeline that is economical to manufacture and install, but which will function effectively and automatically when a rupture of the pipeline occurs.

Other objects and many of the attendant advantages of the invention will become readily apparent from the following description of the preferred embodiment, when taken together with the accompanying drawings.

DESCRIPTION OF THE PREFERRED EMBODIMENT

Figure 1:
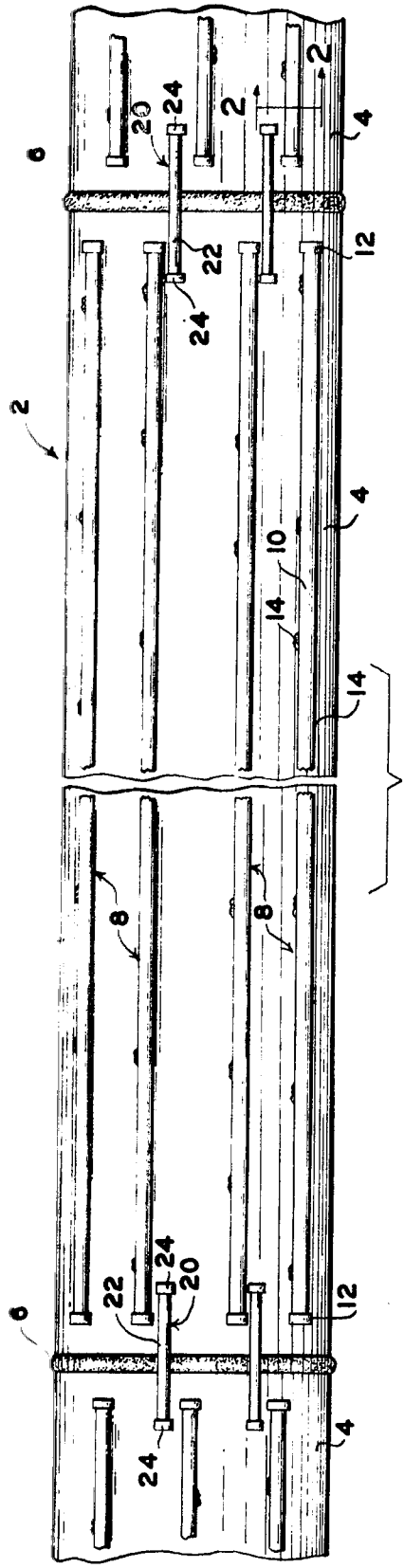
FIG. 1 is a fragmentary, elevational view of a pipeline equipped with an array of the igniters of the invention.
Figure 2:
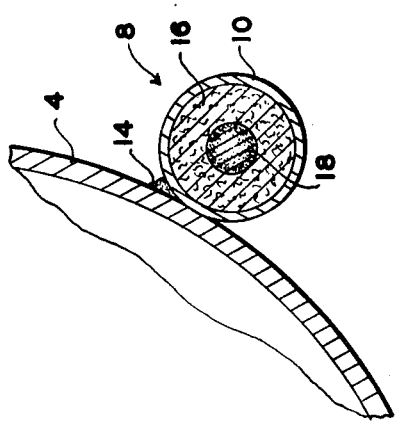
FIG. 2 is an enlarged sectional view taken on the line 2—2 of FIG. 1, showing details of the igniter.

Referring now to the drawings, a pipeline is shown at 2, consisting of sections of pipe 4 secured together at their abutting ends by welds 6, it being understood that any other suitable joining means might also be employed. The pipeline 2 can be installed to be on the ground or on elevated supports, or it can be buried, and such will usually measure many mile in length. Thus, where a pipeline 2 passes through remote areas, it may take several hours for a repair crew to reach the site of a rupture.

Secured to the exterior of each pipe section 4 of the pipeline 2 is an array of longitudinally extending igniters 8, the igniters being spaced circumferentially around their respective pipe section 4 sufficiently close together so that at least one thereof will be broken if a major rupture of the pipe section should occur. Each igniter 8 includes an elongated tube 10 sealed by caps 12 at its opposite ends, and secured to its associated pipe section 4 by spot welds 14 or other suitable means. The tube 10 is made of some suitable frangible material.

Each igniter tube 10 is filled with thermite 16, packed about a phosphorus core 18. Thermite commonly is a mixture of aluminum and ferric oxide, and once ignited burns fiercly at about 3,000°C. Phosphorus, of course, will ignite when exposed to air, and thus the igniter tube is sealed against the entry of air until ignition is desired. A commonly available thermite mixture is known by the trademark "THERMIT," and the use of such is clearly within the concept of the invention.

When the pipeline 2 ruptures so that one or more of the igniters 8 is broken open, the phosphorus core 18 will be exposed to the atmosphere, causing ignition thereof. The burning phosphorus core 18 will then ignite the thermite 16, the burning temperature of the latter being sufficiently high to ignite crude oil and nearly any other combustible material that might be transported in the pipeline 2. Thus, material escaping from the ruptured pipeline 2 will be burned off, and will not be allowed to flow into nearby waterways and otherwise contaminate the environment.

In addition to eliminating contamination by runoff, the flame created by the invention will make detection of the leak by repair crews an easy matter. Once a repair crew is on the scene the ruptured pipeline section can be isolated, thereby cutting off flow therethrough and causing extinguishment of fire.

The length of each igniter 8 is primarily a matter of choice. However, to prevent accidental ignition over a great length of the pipeline it is recommended that each igniter 8 be no longer than its associated pipe length 4. While the igniters 8 are shown extending parallel to the axis of the pipeline 2, it is understood that spiral and other configurations for the array are also possible.

Because it is desirable to an the complete length of the pipeline 2, including joints, as array of short igniters 20 is affixed to the pipeline 2 to bridge each welded joint 6. The igniters 20 include a tube 22 having a cap 24 on each end, and are constructed like the igniters 8.

It is to be understood that some other rapid burning, high heat substance than thermite might be used in the igniters 8 and 20, and that other modifications and variations of the invention are also possible.

I claim:

1. In a pipeline comprising a plurality of connected pipe sections, apparatus for igniting the contents of said pipeline upon a rupture thereof, comprising: at least one igniter affixed to said pipeline, said igniter including: an elongated tube; a combustible substance packed within said tube over the length thereof; and an igniter core disposed within said tube, and operable upon rupture of said tube to ignite said substance.

2. In a pipeline as recited in claim 1, wherein said apparatus includes a plurality of said igniters arranged in spaced relationship around said pipeline, to extend generally longitudinally thereof.

3. In a pipeline as recited in claim 1, wherein said substance is thermite.

4. In a pipeline as recited in claim 1, wherein said igniter core is phosphorus, said igniter tube being sealed to prevent contact of the phosphorus with the atmosphere until rupture of the igniter.

* * * * *